United States Patent Office 3,629,445
Patented Dec. 21, 1971

3,629,445
METHOD OF PREVENTING EXCESSIVE SECRETION OF HYDROCHLORIC ACID
Wilbur Lippmann, Montreal, Quebec, Canada, assignor to Ayerst, McKenna and Harrison Limited, Ville St. Laurent, Quebec, Canada
No Drawing. Filed May 21, 1969, Ser. No. 826,657
Int. Cl. A61k 27/00
U.S. Cl. 424—285         5 Claims

ABSTRACT OF THE DISCLOSURE

Compositions for preventing hyperchlorhydria containing N,3,3,-trimethyl-1-phenyl-1-phthalanpropylamine hydrochloride as active ingredient, and method of treating said condition and associated conditions.

---

This invention relates to a method for preventing the secretion of excessive amounts of hydrochloric acid in the stomach of mammals and to improved pharmaceutical compositions useful for this method. Since the usual peptic ulcer is frequently accompanied by, or the result of, hyperchlorhydria, my method is especially useful in the treatment of peptic ulcers and associated abnormal conditions of the stomach and gastric tract.

I have found that the chemical compound, N,3,3-trimethyl-1-phenyl-1-phthalanpropylamine either in its base form, or in the form of its acid addition salts with pharmaceutically acceptable acids, is particularly effective in preventing the excessive secretion of hydrochloric acid.

The compound, N,3,3-trimethyl-1-phenyl-1-phthalanpropylamine, may be represented by the following formula:

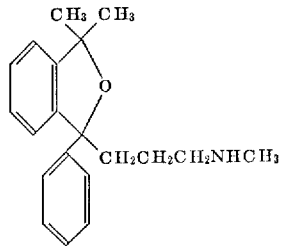

This compound has been described in the literature. For example, the compound is described in the form of its hydrochloride salt by P. V. Petersen et al., in Acta Pharmacol. et Toxicol. vol. 24, page 121 (1966) where it is identified as compound No. 2 on page 124 of the text. A method for the preparation of this active ingredient, the compound N,3,3-trimethyl-1-phenyl-1-phthalanpropylamine and of its hydrochloride salt from readily available starting materials is described in Belgian Pat. No. 678,035, published Sept. 19, 1966. The acid addition salts are prepared by reacting the base with either one equivalent or preferably an excess of the appropriate acid in an organic solvent, such as ether or an ethanol-ether mixture. These salts, when administered to mammals, possess the same activity as the base itself, in preventing the secretion of excessive amounts of hydrochloric acid. For many purposes it is preferable to administer the salts rather than the base compound. Among the acid accition salts suitable for this purpose are salts such as the sulfate, phosphate, lactate, tartarate, maleate, citrate and hydrochloride. The hydrochloride salt is especially convenient. Both the base compound itself and the above acid addition salts have the distinct advantage of possessing a relatively low order of toxicity.

The compound, N,3,3-trimethyl-1-phenyl-1-phthalanpropylamine and its acid addition salts with pharmaceutically acceptable acids may be administered to mammals, for the purpose of preventing secretion of excessive amounts of the hydrochloric acid in the stomach and gastrointestinal tract thereof, either orally or parenterally. For many reasons oral administration is preferred The compounds are soluble in a wide variety of pharmaceutically acceptable solvents and may readily be made up in solvents for oral administartion. They may also be prepared with suitable carriers to form tablets or capsules. Alternatively, they may be suspended in suitable suspending agents and administered in this form.

When N,3,3-trimethyl-1-phenyl-1-phthalanpropylamine or its acid addition salts with pharmaceutically acceptable acids are prepared for oral administration, they may, for example, be incorporated with the usual excipients or carriers, such as lactose, starch or sucrose, in the form of capsules or tablets containing from 10–50 mg. of the active ingredient per capsule or tablet. These pharmaceutical preparations may contain the usual coloring agents, preservatives or other usual ingredients. When liquid preparations are preferred for oral ingestion, the compound, or its acid addition salts, described above, may be dissolved or suspended in a suitable nontoxic carrier, such as, distilled water aqueous alcohol, or a pharmaceutically acceptable oil. The concentration of the active agent is selected to provide a generally useful composition.

A typical composition for oral ingestion, for example, may be a solution, containing 20 to 50 mg. of N,3,3-trimethyl-1-phenyl-1-phthalanpropylamine hydrochloride per millilitre of distilled water, rendered isotonic by the addition thereto of sodium chloride, sodium citrate or glucose.

Such solutions or suspensions may also contain the usual preservatives, sweetening agents, and other agents which are present in conventional liquid pharmaceutical preparations.

For parenteral administration, N,3,3-trimethyl-1-phenyl-1-phthalanpropylamine or its acid addition salts with pharmaceutically acceptable acids may be dissolved or suspended in suitable sterile liquid carriers such as distilled water or oils of synthetic, animal, petroleum or vegetable origin, for example, soybean oil, sesame oil, mineral oil or propylene glycol. The usual preservatives and other ingredients used for pharmaceutical preparations for parenteral dose may also be incorporated. The concentration of the active agent in these preparations for parenteral use is selected to provide a generally useful composition. A typical composition would ordinarily constitute from about 2 to 5% g. by weight, of N,3,3-trimethyl-1-phenyl-1-phthalanpropylamine hydrochloride in sesame oil with 1.5% benzyl alcohol as a preservative.

When utilizing N,3,3-trimethyl-1-phenyl-1-phthalanpropylamine or its acid addition salts, described above, as agents for combatting or preventing hyperchlorhydria, the total daily dose of active agent may range from approximately 0.2 mg. per kilogram of body weight to 2 mg. per kilogram of body weight. Generally, a parenteral dose is administered once a day, whereas the daily oral dose is administered in three or four applications.

The effects of N,3,3-trimethyl-1-phenyl-1-phthalanpropylamine and its acid addition salts with pharmaceutically acceptable acids as agents for preventing hyperchlorhydria and inhibiting hydrochloric acid secretion may be demonstrated by the use of rats, more especially the Shay rat. The rat is the preferred experimental mammal for demonstrating the activity of agents effecting gastric acid secretion and it has been widely used in experimental medicine for this purpose. For instance, on page 149 in "Pathophysiology of Peptic Ulcer," published by McGill University Press, Montreal, Canada in 1963, Skoryna states that many of the drugs now in the in human medicine for the treatment of peptic ulcer have been evaluated by the Shay rat method. It is recognized by skilled pharmacologists that results obtained in the Shay rat in the evaluation of gastric acid conditions are translatable to results that will be obtained when the same drug is administered to human beings. For the value of the Shay rat in experimental gastroenterology, see also the article by Shay et al. in Gastroenterology, vol. 26, p. 906, (1954). This animal is generally recognized as the preferred, or standard, animal for use experimentally in testing drugs used to inhibit gastric acid secretion.

More specifically, it has been demonstrated that when N,3,3-trimethyl-1-phenyl - 1 - phthalanpropylamine or its above acid addition salts, preferably the above hydrochloride salt, is administered to Shay rats in dosages of 0.625 milligram per kilogram of body weight, reduction in the basal hydrochloric acid secretion to a value within the range of 57 percent to 64 percent of control values results. When the compound was administered to Shay rats in dosages of 1.25 milligrams per kilogram of body weight an observed reduction of basal hydrochloric acid secretion from 44 percent to 49 percent of control values occurred. Again, more specifically, the ability of N,3,3-trimethyl-1-phenyl-1-phthalanpropylamine hydrochloride to inhibit the secretion of hydrochloric acid and prevent ulcer formation in rats, was demonstrated experimentally in accordance with the method described by Brodie et al. in Proc. Soc. Exp. Biol. Med., vol. 113, p. 998 (1963), this method having been modified to some extent in accordance with the procedure of Senay et al. as described in vol. 124, p. 1221 (1967) of the same publication. In this modified procedure rats were injected intraperitoneally with pharmaceutical preparations containing the compound as active agent. The intraperitoneal administration of N,3,3-trimethyl-1-phenyl-1-phthalanpropylamine hydrochloride in dosages of 6.3±1.4 milligrams per kilogram of body weight was found to protect 50 percent of the test animals from ulcer formation. Under the conditions of this test, 80–100 percent of the untreated rats used as controls developed gastric lesions, consisting of one or several macroscopical erosions of the glandular mucosa, often accompanied by haemorrhage.

In a comparison with the known compound atropine sulfate, which is presently utilized for preventing ulcer formation, while atropine sulfate was found to protect from 50 to 75 percent of the test animals when administered at dosages of 2 milligrams per kilogram of body weight, the typical undesirable anti-chlorinergic effects of atropine were clearly observable in the rats to whom the atropine sulfate had been administered. As contrasted with these undesirable effects the administration of N,3,3-trimethyl-1-phenyl-1-phthalanpropylamine hydrochloride to the test animals in the dosages referred to above were found not to result in any observable undesirable side effects, side effects resulting from anti-chlolinergic activity being conspicuously absent.

The following examples will illustrate this invention.

EXAMPLE 1

(a) N,3,3 - trimethyl-1-phenyl-1-phthalanpropylamine hydrochloride (20 g.) is dissolved in 980 ml. of distilled water, the solution is made isotonic by addition of sodium chloride or sodium citrate or glucose, a preservative such as 0.1 percent weight by volume of Methylparaban and 0.015 percent weight by volume of Propylparaban or 0.5 percent weight by volume of chlorbutanol is added, the solution is made up to 1000 ml. with distilled water, sterilized by autoclaving or sterile filtration, and filled into 2 ml. ampoules or vials, to make a solution for parenteral administration containing 20 mg./ml. of the active ingredient.

(b) In the same manner, but using 50 g. of N,3,3-trimethyl-1-phenyl-1-phthalanpropylamine hydrochloride, a solution for parenteral administration containing 50 mg./ml. of the active ingredient is obtained and is filled into 2 ml. ampoules or vials.

(c) N,3,3 - trimethyl-1-phenyl-1-phthalanpropylamine hydrochloride (20 g.) is suspended in 965 g. of sesame oil and 15 g. of benzyl alcohol by means of a mechanical blender. The suspension is filled into 2 ml. ampoules or vials. After autoclaving, a suspension containing 2% of the active ingredient by weight is obtained for parenteral administration.

(d) Again in the same manner, but using 0.225 g., 0.45 g., 2.5 g., 5.0 g., or 10.0 g. of N,3,3-trimethyl-1-phenyl-1-phthalanpropylamine hydrochloride alone, without additives or preservatives, solutions for parenteral or oral administration for pharmacological purposes containing 0.225 mg./ml., 0.45 mg./ml., 2.5 mg./ml., 5.0 mg./ml., and 10.0 mg./ml. of the active ingredient are obtained, respectively.

EXAMPLE 2

(a) N,3,3-trimethyl-1-phenyl - 1 - phthalanpropylamine hydrochloride (50 g.) is mixed with 150 grams lactone, 44 grams starch, 4 grams magnesium stearate and 2 grams sucrose. The mixture is granulated with addition of a small amount of water, dried and compressed into tablets weighing 250 mg. each, to make 1000 tablets containing 50 mg. each of the active ingredient.

(b) In the same manner, but using 10 g. of N,3-trimethyl-1-phenyl - 1 - phthalanpropylamine hydrochloride, 190 g. lactose, 44 g. starch, 4 g. magnesium stearate, and 2 g. sucrose, there are obtained 1000 tablets of 250 mg. weight each, such tablets containing 10 mg. each of the active ingredient.

(c) Again in the same manner, but using 25 g. of N,3,3-trimethyl-1-phenyl-1-phthalanpropylamine hydrochloride, 175 g. lactose, 44 g. starch, 4 g. magnesium stearate, and 2 g. of sucrose, there are obtained 1000 tablets of 250 mg. weight each, such tablets containing 25 mg. each of the active ingredient.

EXAMPLE 3

The inhibition of basal gastic acid secretory activity by N,3,3-trimethyl-1-phenyl-1-phthalanpropylamine hydrochloride was determined by a modified method of Shay et al. cited above. Charles River female albino rats (Canadian Breeding Laboratories; 170–190 g.) were caged individually 48 hours prior to treating. After the first 24 hours of food deprivation the animals were given access to 8% sucrose in 0.2% sodium chloride for 8 hours. Water was permitted ad libitum except during the 8 hours of sucrose. Three hours after the pyloric ligation the animals were anesthetized with ether and the amount of acid in the stomach determined by titration against 0.1 N sodium hydroxide in a direct reading pH meter to 7.0. There were 4–9 animals in each group.

When the rats were subjected to the above procedure without treatment with N,3,3-trimethyl-1-phenyl-1-phthalanpropylamine hydrochloride approximately 0.45 milliequivalents of hydrochloric acid were secreted per rat during a period of three hours (0.44±0.03 to 0.47±0.04 milliequivalents).

A solution of N,3,3-trimethyl-1-phenyl-1-phthalanpropylamine hydrochloride containing 0.225 mg./ml. in sterile distilled water was prepared, according to the procedure described in Example 1(d), and the rats to be treated with N,3,3-trimethyl-1-phenyl-1-phthalanpropylamine hydrochloride were administered with 0.5 ml. each of the above solution, equivalent to a dosage level of 0.625 mg./kg. body weight. This administration was carried out immediately following pyloric ligation, and the acid contents of the stomach were determined three hours later in the same manner as described above. It was found that 0.27±0.03 to 0.28±0.05 milliequivalents of a hydrochloric acid had been secreted in the above three-hour period by the animals treated as above, corresponding to a reduction to 57–64 percent of control values.

In another experiment a solution containing 0.45 mg./ml. of N,3,3-trimethyl-1-phenyl-1-phthalanpropylamine hydrochloride, was prepared as described in Example 1(d), and the rats were injected intraperitoneally with 0.5 ml. of that solution each in the same manner as described above, equivalent to a dosage level of 1.25 mg./kg. body weight. It was found that 0.21±0.03 milliequivalents of hydrochloric acid had been secreted by the animals treated in the above manner during the standard three hour period, corresponding to a reduction of secretion of hydrochloric acid to 49 percent of control values.

Using the same experimental procedure described above, it may be shown that the administration of the remaining preparations described in Example 1 reduce the secretion of hydrochloric acid in the animals relative to control values.

EXAMPLE 4

Male albino rats of 170–190 g. body weight each were restrained in a plastic box equipped with baffles so as to make movements of the animal impossible, and were kept at room temperature in this condition for 45 minutes. They were then exposed for 105 minutes to a temperature of 5° C. One hour later the rats were killed with ether and their stomachs removed. The stomachs were cut open along the longest curvature and were then unfolded for inspection. The results were evaluated visually in an all or none fashion based on the presence or the absence of lesions independent of their number and severity. Under those conditions 80–100 percent of the untreated rats used as controls developed gastric lesions, consisting of one or several macroscopical erosions of the glandular mucosa, often accompanied by hemorrhage.

When rats were injected intraperitoneally 45 minutes before the beginning of the above test with doses of the solutions of N,3,3-trimethyl-1-phenyl-1-phthalanpropylamine hydrochloride described in Example 1(c) corresponding to 2.5 mg. per kilogram body weight, 88 percent of the rats thus treated showed gastric lesions as described above. When the same experiment was repeated with doses corresponding to 5.0 mg. per kilogram body weight, 50 percent of the rats thus treated showed the same type of gastric lesions. And when this same experiment was repeated with doses corresponding to 10.0 mg. per kilogram body weight, 36 percent of the rats thus treated showed the same type of gastric lesions.

When the above results were statistically calculated by Probit analysis, it was found that the effective dose of N,3,3 - trimethyl-1-phenyl-1-phthalanpropylamine hydrochloride protecting 50 percent of the rats ($ED_{50}$) was 6.3±1.4 mg. per kilogram body weight, and that such doses caused no untoward effects whatsoever. Altropine in doses of 2 mg. per kilogram body weight was used in the above experiments as a standard control, and while the above amount of atropine protected about 50 percent of the animals, the toxic side effects of atropine were apparent.

I claim:

1. The method of preventing the excessive secretion of hydrochloric acid in the stomach of a mammal which comprises administering thereto an effective dose of a compound selected from the group which consists of N,3,3 - trimethyl-1-phenyl-phthalanpropylamine and an acid addition salt wtih a pharmaceutically acceptable acid.

2. The method as claimed in claim 1 wherein the acid addition salt with a pharmaceutically acceptable acid is N,3,3 - trimethyl-1-phenyl-1-phthalanpropylamine hydrochloride.

3. The method as claimed in claim 1 wherein the administration is by the oral route.

4. The method as claimed in claim 1 wherein the administration is by the parenteral route.

5. The method as claimed in claim 1 wherein the effective dose is from about 0.2 mg. to 2 mg. per kilogram of body weight per day.

References Cited

FOREIGN PATENTS 678,035   9/1966   Belgium.

STANLEY J. FRIEDMAN, Primary Examiner